United States Patent [19]

O'Rourke

[11] Patent Number: 5,148,770
[45] Date of Patent: Sep. 22, 1992

[54] CHEW TOY FOR DOGS

[75] Inventor: Anthony O'Rourke, Malibu, Calif.

[73] Assignee: Booda Products, Inc., Gardena, Calif.

[21] Appl. No.: 770,522

[22] Filed: Oct. 3, 1991

[51] Int. Cl.⁵ ............................................. A01K 29/00
[52] U.S. Cl. ..................................... 119/29; 426/805; 426/641
[58] Field of Search .......................... 119/29, 29.5, 174; 426/3, 805, 641; 452/198

[56] References Cited

U.S. PATENT DOCUMENTS

| | | | |
|---|---|---|---|
| 1,149,170 | 8/1915 | Allis | 119/29.5 |
| 2,185,547 | 1/1940 | Fowler | 119/29 |
| 4,610,641 | 9/1986 | Allen | 119/29 |
| 5,084,297 | 1/1992 | Merrick | 426/641 |

FOREIGN PATENT DOCUMENTS 2710576  9/1978  Fed. Rep. of Germany ........ 119/29

Primary Examiner—John G. Weiss
Attorney, Agent, or Firm—Lyon & Lyon

[57] ABSTRACT

A chew toy comprised of a pair of cattle hooves and length of flexible cotton rope secured to and extending between the hooves whereby the hooves are carried by the rope and the rope obstructs access to the natural cavities within the hooves, thereby inhibiting the ability of a pet to grip one of the side walls of the hooves between its teeth and obtain sufficient leverage thereon to fracture the side wall. The soft cotton rope also renders the chew toy flexible and easily manipulated by the pet and additionally provides an alternative chewing surface which provides a gentle massaging of the pet's gums and a flossing of the pets teeth when chewed.

6 Claims, 2 Drawing Sheets

CHEW TOY FOR DOGS

BACKGROUND OF THE INVENTION

The use of processed cattle hooves as a dog chew is well-known. They are high in protein and low in fat and have been found to be very appealing to dogs. A method for processing cattle hooves for such use is disclosed in U.S. Pat. Nos. 4,985,964 and 5,007,879. The process disclosed therein generally comprises the steps of cleaning the hoof to remove any debris therein, removing the upper brittle edge of the hoof, removing a thin portion of the bottom of the hoof pad with a saw blade, and finally boiling, rinsing and drying the hoof. It has been found that by thoroughly cleaning the hoof, removal of a portion of the pad is not necessary, leaving the hoof with a more natural appearance and the entire pad, which is the portion of the hoof which seems to be most preferred by dogs.

While cattle hoof dog chews are quite popular, they have been found to occasionally fracture along their thin side walls producing sharp fragments which present a safety hazard to the dog. The tendency of a cattle hoof to fracture while being chewed by a dog results not only because of the relatively thin side wall of the hoof but because of the natural cavity therein. The cavity in the hoof allows a dog to position either its lower or upper teeth within the hoof so that the dog can firmly grip the side wall of the hoof between its upper and lower teeth and exert sufficient leverage against the wall while chewing, that a fracture occurs.

In addition to the safety hazard resulting from the nature hoof configuration, cattle hooves tend to be too small for many dogs to readily position the hoof with their paws for chewing in the typical dog-like fashion. As a result, dogs will often loose interest in the hoof as a chew toy. Because of the apparent appealing taste of cattle hooves to dogs and the fact that such hooves are quite nutritious, it would be highly desirable to provide a hoof dog chew which retains all of the benefits of nature cattle hooves but which eliminated the safety hazard posed by the hoof configuration. It would also be beneficial if such a dog chew could be designed such that it could be more readily manipulated by the dog for chewing. The present invention not only achieves these results but also incorporates the therapeutic gum and tooth flossing benefits found in cotton rope chew toys such as that marketed by applicant under the trademark BOODA BONES which is the subject of a pending U.S. Design patent application Ser. No. 421,006.

SUMMARY OF THE INVENTION

Briefly, the present invention comprises a pair of cattle hooves which have been thoroughly cleaned to meet dog chew standards and are joined together in a spaced disposition by a length of a cotton rope, such that the opposite ends of the rope project into the natural cavities of the two hooves and are secured therein by a non-toxic food grade quality hot melt adhesive. The length rope extending between the two hooves not only allows the dog to easily manipulate one of the hooves for chewing, renders the toy flexible which has been found to be more interesting to dogs than rigid chew toys, and provides an alternate chew with gum massaging and tooth flossing therapeutic benefits, but also obstructs the openings to the hoof cavities and inner side walls of the hooves so that the dog cannot readily obtain a secure grip with its teeth on the interior side wall and fracture the hoof.

It is the principal object of the present invention to provide a new and improved dog chew.

It is another object of the present invention to provide a cattle hoof dog chew which is configured so a to prevent a dog from being able to readily fracture the hoof while chewing thereon.

It is a further object of the present invention to provide a dog chew which is nutritious and provides a massaging of the dog's gums and flossing of the dog's teeth during use.

It is yet another object of the present invention to provide a dog chew comprising a cattle hoof which is flexible and can be easily manipulated by the dog to facilitate holding and chewing thereon.

These and other objects and advantages of the present invention will become readily apparent from the following description taken in conjunction with the accompanying drawings.

DESCRIPTION OF THE PREFERRED EMBODIMENTS

Figure 1:
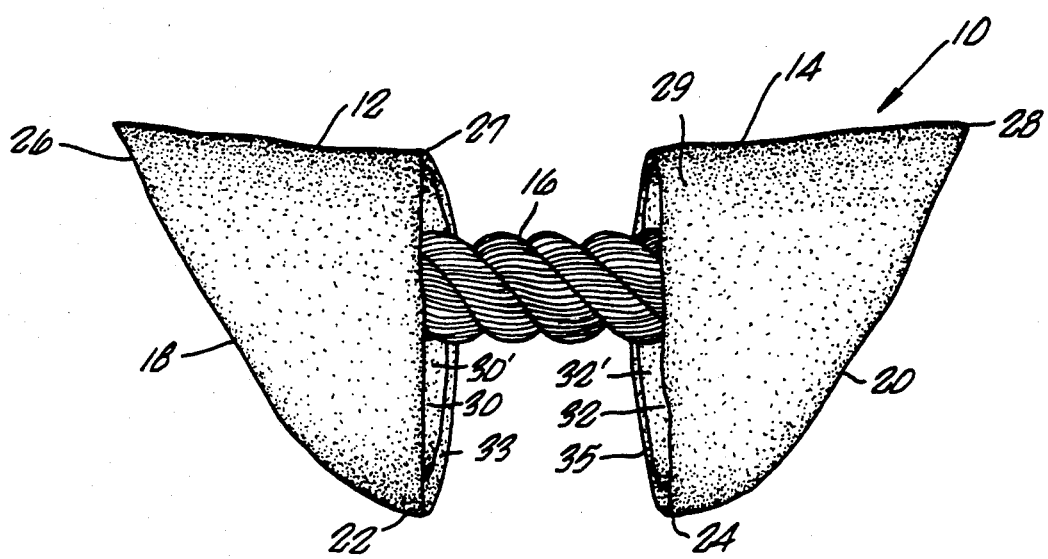
FIG. 1 is a front elevational view of the chew toy of the present invention.
Figure 2:
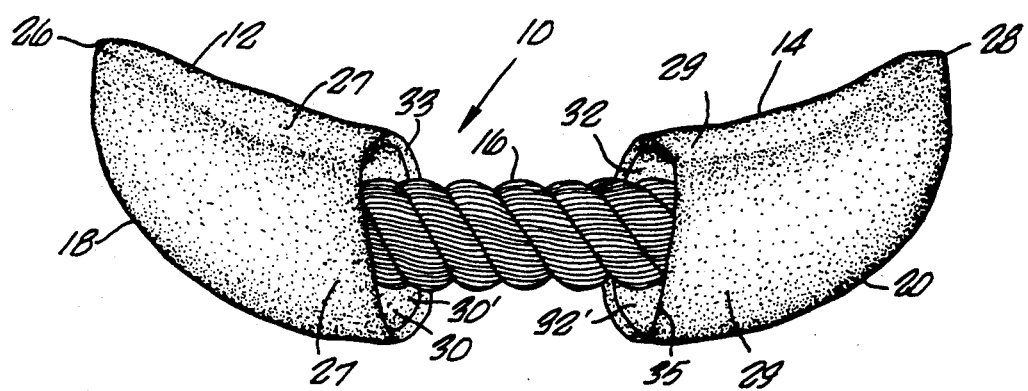
FIG. 2 is a top plan view of the chew toy of the present invention.
Figure 3:
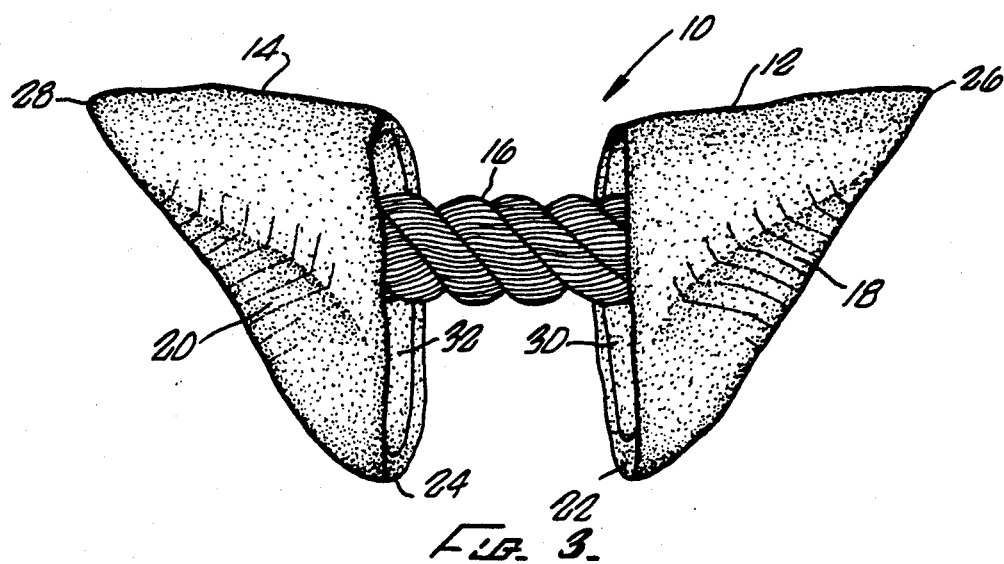
FIG. 3 is a rear elevational view of the chew toy of the present invention.
Figure 4:
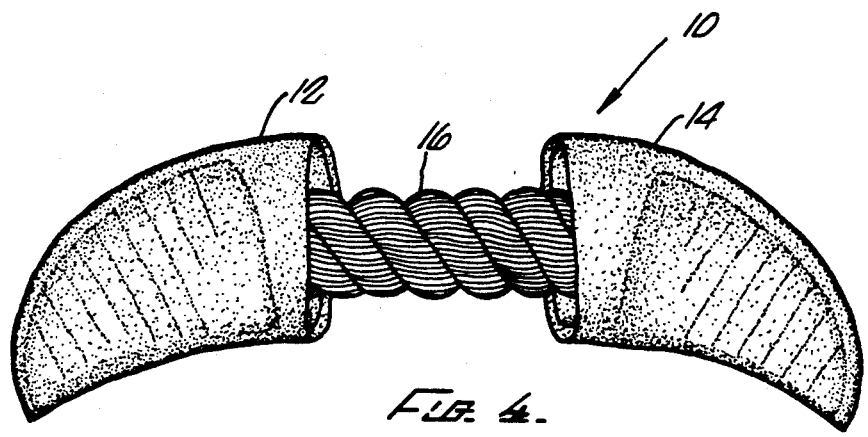
FIG. 4 is a bottom plan view of the chew toy of the present invention.
Figure 5:
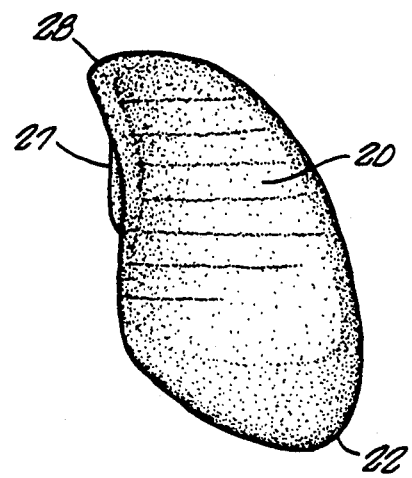
FIG. 5 is an end view of the chew toy of the present invention.

The chew toy 10 of the present invention comprises a pair of cleaned and sterilized cattle hooves 12 and 14 which are oppositely aligned and carried by a relatively short length of rope 16, preferably cotton. For purposes of symmetry, hoof 12 is preferably a left footed cow hoof, while hoof 14 is preferably right footed and of similar size to hoof 12. Hooves 12 and 14 define relatively thick pad portions 18 and 20 respectively, heel portions 22 and 24, toe portions 26 and 28, relatively thin side wall portions 27 and 29 and cavities 30 and 32. The upper edges 33 and 35 of hooves 12 and 14 have preferably been trimmed to remove the uppermost portion thereof and provide the hooves With relatively smooth upper edge surfaces.

Figure 6:
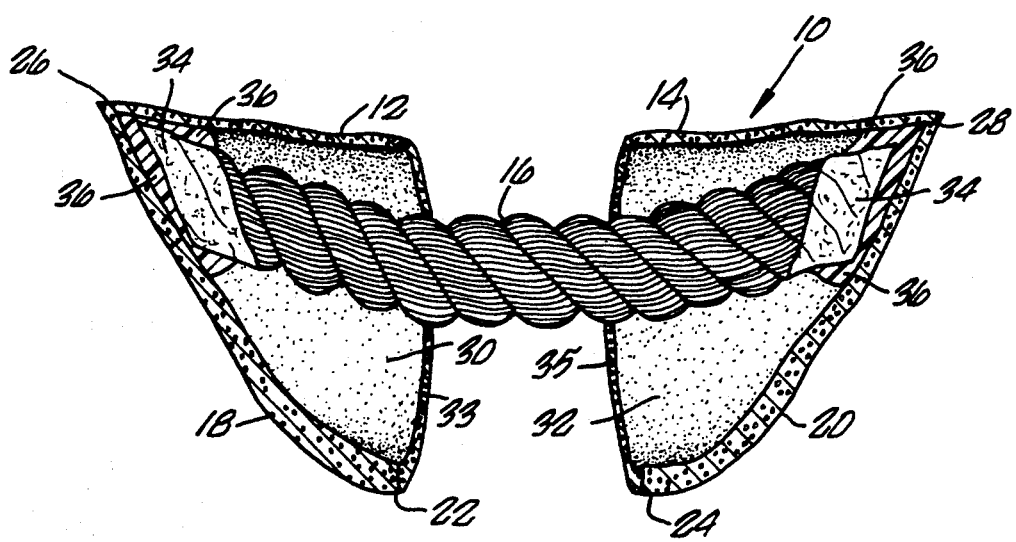
FIG. 6 is a sectional view of the chew toy of the present invention showing the securement of the rope to the cattle hooves.

The cotton rope 16 is cut at angles of about forty-five degrees at its extended ends which are then wrapped with lengths of tape 34 to prevent the ends of the rope 16 from unraveling. The taped ends of ropes 16 extend into the hoof cavities 30 and 32 and are positioned against the interior toe portions 26 and 28 thereof. A non-toxic hot melt adhesive 36 is utilized for securing the taped ends of rope 16 against the interior toe portions 26 and 28 of the hooves as seen in FIG. 6. Through this configuration, the cavity openings 30' and 32' in hooves 12 and 14 and the interior of side wall portions 27 and 29 are sufficiently obstructed by the rope 16 that a dog is prevented from gaining sufficient access to the hoof cavities to get a leveraged grip with its teeth about one of the thinner side wall portion 27 or 29 of the hooves whereby it could readily fracture the hoof while chewing thereon.

Different sized hooves and rope are preferably employed for providing differently sized toys 10 for differently sized dogs. In addition to protecting the hooves 12 and 14 from fracture, rope 16 renders the chew toy 10 flexible so that it is a more entertaining toy for a dog than a conventional rigid chew toy and allows the dog to readily manipulate the toy with its paws to hold the toy therebetween while chewing.

It has been found that due to the relative disposition of the hooves 12 and 14 with rope 16, when a dog positions the toy 10 with its paws to chew on one of the hooves in a customary dog-like manner, the pad portion 18 or 20 of the selected hoof is elevated with the rope 16 depending therefrom. In this position, the two most accessible portions of the held hoof ar its toe portion 26 or 28 and its heel portion 22 or 24 which are substantially thicker than the side wall portion 27 or 29. Thus, rope 16 not only obstructs the entrance to the hoof cavities 30 and 32 and the interior surface of the thinner hoof side wall, but also tends to naturally position the sidewall so that its is not as readily accessible for chewing. In so doing, rope 16 substantially reduces the possibility of a dog fracturing the hoof during use. In addition, rope 16, being of a soft cotton material, additionally provides the dog with an alternative chewing surface which both massages the dog's gums and flosses the dog's teeth while being chewed.

Various changes and modifications may be made in carrying out the present invention without departing from the spirit and scope thereof. Insofar as these changes and modifications are within the purview of the appendix claims, they are to be considered as part of the present invention.

I claim:

1. A chew toy for pets comprising a pair of hooves, each of said hooves defining a cavity therein, a length of rope defining oppositely extending end portions, each of said end portions extending into one of the cavities in one said hooves, and mean for securing each of said end portions of said length of rope within one of the cavities of said hooves such that said length of rope is secured to and extends between said hooves.

2. The chew toy of claim 1 wherein said hooves each define a pad portion, a side wall portion, and a toe portion adjacent the pad and sidewall portions, and wherein each of the end portions of said length of rope are secured to one of the hooves at the toe portion thereof, thereby obstructing access to the interior of the side walls of the hooves and reducing the likelihood of a pet fracturing one of the side walls while chewing thereon.

3. The chew toy of claims 1 or 2 wherein said length of rope is flexible and comprised of cotton to provide a massaging of the pet's gums and flossing of the pet's teeth during use and wherein said securing means comprises a non-toxic hot melt adhesive.

4. A chew toy for pets comprising a pair of hooves, each of said hooves defining a sidewall and a cavity therein, a length of flexible rope defining oppositely extending end portions, each of said end portions extending into one of the cavities in one of said hooves, and means for securing each of said end portions of said length of rope to on of said hooves within the cavity therein such that said length of rope is secured to and extends between said hooves and obstructs access to said cavities therein, thereby inhibiting the ability of a pet to grip the side wall of one of the hooves between its teeth and fracture the side wall.

5. The chew toy of claim 4 wherein said securing means comprises a non-toxic hot melt adhesive.

6. The chew toy of claims 4 or 5 wherein said length of rope is comprised of cotton and provides a massaging of the pet's gums and flossing of the pet's teeth during use.

* * * * *